Aug. 9, 1960     K. L. PHILLIPS ET AL     2,948,351

FOAM BREAKING DEVICE

Filed Sept. 22, 1958

INVENTOR
Kenneth L. Phillips
Henry K. Sallans
BY Alex. E. MacRae
ATTORNEY

United States Patent Office 2,948,351
Patented Aug. 9, 1960

2,948,351

FOAM BREAKING DEVICE

Kenneth L. Phillips and Henry R. Sallans, Saskatoon, Saskatchewan, Canada, assignors to National Research Council, Ottawa, Ontario, Canada, a body corporate of Canada Filed Sept. 22, 1958, Ser. No. 762,612

5 Claims. (Cl. 183—2.5)

This invention relates to foam destroying or breaking devices.

The problem of dealing with incidental foam produced in many industrial operations is a well-recognized one and many proposals have heretofore been made for breaking down such foam. For instance, in aerobic fermentation equipment, it is necessary to destroy or contain the foam produced in order to prevent the contents of the fermentor from being exhausted at relatively high air-sparging rates.

Heretofore proposed procedures usually involve either the addition of antifoam chemicals such as fats or silicones or the use of mechanical devices which employ centrifugal force or impact to break the foam. However, in fermentation procedures, chemical antifoams add an extraneous substance which affects growth and product formation by the organisms and in many fermentations presence of the chemical complicates recovery of products. Moreover, addition of chemical antifoams affects aeration by changing bubble size and the oxygen transfer coefficient. Mechanical devices, such as rotating discs and centrifugal breakers, have a limited working range. Their capacity is soon exceeded and under these conditions they may actually pump foaming material out of the fermentor.

It is an object of this invention to provide a foam breaking device of simple construction, convenient operation, and effective results under substantially all conditions of practical operation.

The invention resides in a foam breaking device which comprises, in combination with a tank or vessel containing foam to be destroyed, a separation chamber, a jet communicating with said chamber, a conduit leading from said vessel to said jet, said jet having a restricted cylindrical passage to build up pressure in said vessel and cause high speed passage of foam through the jet, said conduit being uninterrupted throughout its length for passage therethrough of foam solely under the influence of said pressure.

Figure 1:
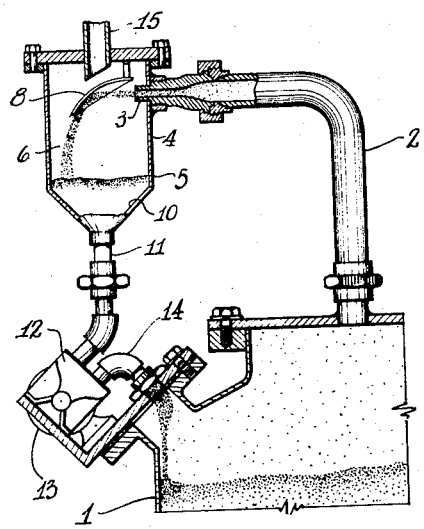
Figure 3:
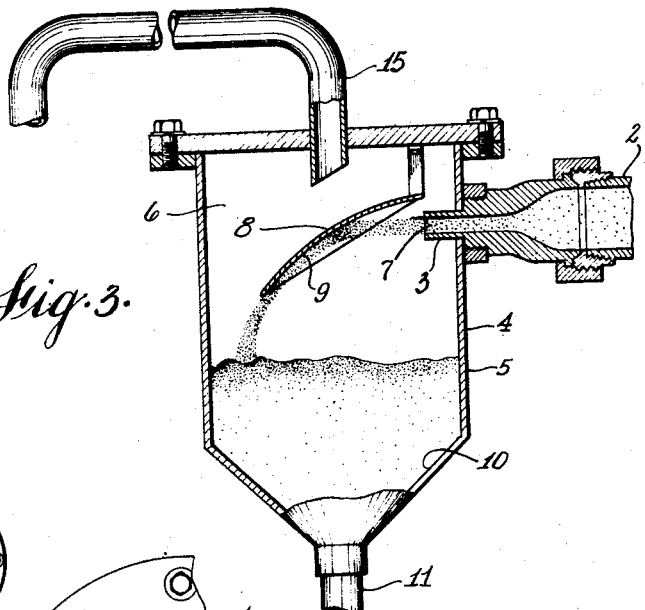
Figure 2:
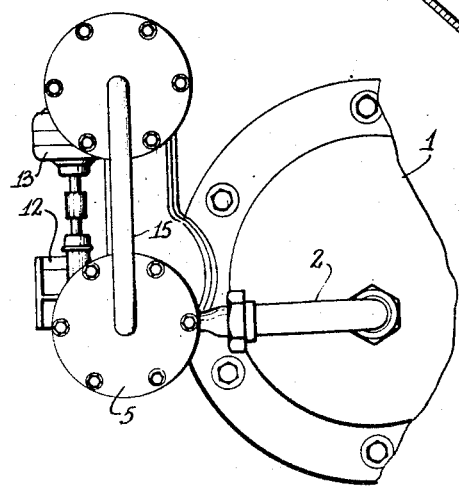

The invention will be described with reference to the accompanying drawing, in which Figure 1 is a sectional side elevation of a device in accordance with the invention, Figure 2 is a plan view, and Figure 3 is an enlarged sectional side elevation of the device.

In the drawing, 1 is a tank or vessel which may be a fermentor containing materials under aeration. Leading from the top of the vessel 1 is a conduit 2 which is connected to a nozzle or jet 3 mounted in the side wall 4 of a cylindrical vessel 5 forming a separation chamber 6. The nozzle 3 has a plain cylindrical restricted passage 7, the diameter of which is of a size to impart sufficient velocity to the foam passing through it to ensure that the material issuing from it is essentially free of bubbles. It will be apparent that the nozzle is interchangeable with nozzles of varying internal diameters so that the foam breaker will operate over a wide range of air flow rates through vessel 1. The conduit should have a sufficiently large diameter so that the passage of foam is substantially uninterrupted throughout its length. Preferably, there is mounted in chamber 6 a baffle 8 in opposed relation to the nozzle 3 to receive and deflect the output of the orifice. As shown, the baffle is inclined downwardly with respect to the axis of the nozzle and has a concave surface 9 against which the output of the orifice may impinge. The angle of inclination of the baffle may vary from about 30° to 45° and is shown approximately 37° to the horizontal. Vessel 5 may have a conical bottom portion 10 for collection of liquid and an outlet conduit 11 leads therefrom. The conduit 11 communicates with a pump 12 which may be driven by a motor 13 to pump the collected liquid back into the tank 1 through conduit 14. The pump and foam breaking assembly must be constructed to withstand normal steam sterilization pressures and temperatures encountered in vessel 1. In operation, effluent air from the tank 1 passes into the separation chamber through conduit 2 and nozzle 3. Under foaming conditions, resistance in the nozzle results in a pressure build up, which may be of the order of 3–5 pounds per square inch in the tank 1. Thus, the foam is forced through the nozzle orifice at 100–300 feet per second against baffle surface 9. The high speed jet performs a primary and major break up effect upon the foam, some secondary and substantially complete break up action on any remaining foam being performed by impingement thereof on the baffle surface 9. The defoamed liquid is then returned to the tank through conduits 11 and 14 by means of pump 12 which must, of course, be capable of pumping against the head of 3–5 pounds per square inch. A vent 15 is provided in vessel 5 for effluent air.

It will be observed the entire energy required for breaking up the foam by means of a high speed jet is supplied by the air used in the fermentation or other basic procedure, no pump or other energy supplying means being required.

We claim:

1. In combination with a vessel containing liquid and a body of foam above the level of said liquid caused by foaming conditions in said liquid, a foam breaking device comprising a separation chamber, a nozzle having an outlet orifice communicating with said chamber and a substantially horizontally disposed axis, a conduit leading from said vessel above said liquid level to said nozzle; said conduit being substantially uninterrupted throughout its length and constituting a sole outlet for said body of foam, said conduit having a relatively large internal diameter for unrestricted entrance of foam therein, said nozzle having a single cylindrical passage leading to said orifice and said orifice being of a relatively much smaller diameter than that of said conduit to build up pressure in said body of foam of the order of three to five pounds per square inch in said vessel whereby said foam flows through said restricted passage at high speed under the influence of said pressure to break up said foam and a fixed baffle in said chamber, said baffle having a single downwardly directed uninterrupted surface located in adjacent opposed relation to said outlet orifice for impingement by and deflection of liquid issuing from said orifice, said surface being at an angle of not substantially more than 45° to said axis of said nozzle.

2. A foam breaking device as defined in claim 1, said baffle surface being concave.

3. A foam breaking device as defined in claim 1, including a pipe leading from the bottom portion of said chamber to said vessel for return of liquid collected in said chamber to said vessel, and a pump in said pipe, said chamber having an air outlet therein.

4. A foam breaking device as defined in claim 1, said angle of said surface being not less than approximately 30°.

5. A foam breaking device as defined in claim 1, said angle of said surface being approximately 37°.

References Cited in the file of this patent

UNITED STATES PATENTS

| 151,664 | Hobson | June 2, 1874 |
| 1,893,411 | Hallermann | Jan. 3, 1933 |

FOREIGN PATENTS

| 541,150 | France | Apr. 28, 1922 |
| 773,096 | Great Britain | Apr. 24, 1957 |